United States Patent
Kim et al.

(10) Patent No.: US 9,831,484 B2
(45) Date of Patent: Nov. 28, 2017

(54) RECHARGEABLE BATTERY

(71) Applicant: SAMSUNG SDI CO., LTD., Yongin-si, Gyeonggi-do (KR)

(72) Inventors: In Kim, Yongin-si (KR); Jae-Kyung Kim, Yongin-si (KR); Sang-Won Byun, Yongin-si (KR); Won-Jun Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 191 days.

(21) Appl. No.: 14/644,507

(22) Filed: Mar. 11, 2015

(65) Prior Publication Data

US 2015/0349384 A1 Dec. 3, 2015

(30) Foreign Application Priority Data

May 28, 2014 (KR) .......... 10-2014-0064736

(51) Int. Cl.
*H01M 2/30* (2006.01)
*H01M 2/34* (2006.01)
*H01M 2/04* (2006.01)
*H01M 10/48* (2006.01)

(52) U.S. Cl.
CPC .............. *H01M 2/30* (2013.01); *H01M 2/04* (2013.01); *H01M 2/34* (2013.01); *H01M 2/0473* (2013.01); *H01M 10/48* (2013.01); *H01M 2200/103* (2013.01)

(58) Field of Classification Search
CPC ........ H01M 2/30; H01M 2/0473; H01M 2/34; H01M 2200/103
See application file for complete search history.

(56) References Cited

U.S. PATENT DOCUMENTS

| | | | |
|---|---|---|---|
| 2010/0323234 A1* | 12/2010 | Kim .............. | H01M 2/206 429/158 |
| 2012/0148884 A1* | 6/2012 | Kim .............. | H01M 2/06 429/61 |
| 2012/0225333 A1* | 9/2012 | Kim .............. | H01M 2/021 429/61 |
| 2013/0115511 A1* | 5/2013 | Han .............. | H01M 2/1241 429/208 |
| 2014/0193704 A1* | 7/2014 | Kim .............. | H01M 2/06 429/179 |
| 2014/0199562 A1* | 7/2014 | Kim .............. | H01M 2/06 429/7 |
| 2014/0377600 A1* | 12/2014 | Guen ............. | H01M 2/0456 429/61 |

FOREIGN PATENT DOCUMENTS

| | | |
|---|---|---|
| KR | 97-25883 U | 6/1997 |
| KR | 10-2009-0055088 A | 6/2009 |

* cited by examiner

*Primary Examiner* — Jonathan Jelsma
(74) *Attorney, Agent, or Firm* — Lee & Morse P.C.

(57) ABSTRACT

A battery includes a case, first and second electrodes in the case, and a switch to change an electrical state of the case between a first state and a second state, when the first state corresponds to an electrically neutral state and the second state corresponds to an electrical polarity of the first electrode. The switch may reciprocally change the electrical state of the case between the first state and the second state.

16 Claims, 13 Drawing Sheets

RECHARGEABLE BATTERY

CROSS-REFERENCE TO RELATED APPLICATION

Korean Patent Application No. 10-2014-0064736, filed on May 28, 2014, and entitled, "Rechargeable Battery," is incorporated by reference herein in its entirety.

BACKGROUND

1. Field

One or more embodiments described herein relate to a battery.

2. Description of the Related Art

A rechargeable battery is one that is repeatedly charged and discharged. A low-capacity rechargeable battery is often used in small portable electronic devices, e.g., mobile phones, notebook computers, and camcorders. A high-capacity rechargeable battery is often used in hybrid or electric vehicles or large-capacity power storage devices.

High-capacity rechargeable batteries include one or more battery modules, each equipped with multiple rechargeable batteries connected in series. The batteries are enclosed within a case that is either electrically neutral or has an electrical (i.e., positive or negative) polarity. Unlike a battery with an electrically neutral case, a battery having a positively charged case is safe against short circuits caused by penetration of external foreign objects (e.g., nails). Also, the existence of a voltage abnormality of a battery having a case with an electrical polarity can be easily checked.

In order to configure a battery module with a case having an electrical polarity, insulation may be used. This insulation increases production costs. Therefore, it is cost effective to use rechargeable batteries that are electrically neutral.

However, because a battery with an electrically neutral case is unstable compared to a battery with a case having an electrical polarity, the existence of a voltage abnormality of a battery with an electrically neutral case cannot be easily checked.

SUMMARY

In accordance with one embodiment, a rechargeable battery includes a case, an electrode assembly including first and second electrodes in the case, a cap plate coupled to or over an opening of the case, a terminal plate electrically coupled to the first electrode through the cap plate, an insulator between the terminal plate and the cap plate, and an electrode switch to move through the terminal plate and the insulator between first and second positions, wherein the electrode switch contacts the cap plate in the first position and does not contact the cap plate in the second position.

The case may have electrical polarity of the first electrode when the electrode switch is in the first position, and the case may be electrically neutral when the electrode switch is in the second position.

The rechargeable battery may include a fixing member to fix the electrode switch to the terminal plate, and the electrode switch and the cap plate being separated by the fixing member. The terminal plate may include a first hole to be coupled to the fixing member, and the electrode switch may include a coupling hole to be coupled to the fixing member. The electrode switch and the cap plate may contact each other when the fixing member is separated from the coupling hole of the electrode switch. The elastic member may be between the electrode switch and the terminal plate. The may include a spring.

The insulator may include a second hole to be coupled to the fixing member, and the fixing member may be coupled to the coupling hole of the electrode switch to maintain a contacting state of the electrode switch and the cap plate. The electrode switch may include a head portion coupled to the terminal plate, and a body extending from the head portion. The electrode switch may include a handle portion coupled to the head portion. The body may include a screw thread, and the body may have a length exceeding an interval between the terminal plate and the cap plate.

In accordance with another embodiment, a battery includes a case, first and second electrodes in the case, and a switch to change an electrical state of the case between a first state and a second state, when the first state corresponds to an electrically neutral state and the second state corresponds to an electrical polarity of the first electrode. The switch may reciprocally change the electrical state of the case between the first state and the second state. The switch may change the electrical state of the case based on a force derived from an action of a user.

The battery may include a conductor coupled to the first electrode, wherein the switch establishes an electrical path between the first electrode and the case through the conductor when the switch is in the second position and disrupts the electrical path between the first electrode and the case when the switch is in the first position.

The switch may include a body including a hole, wherein the hole in the body receives a retainer when the body is in a first position and does not receive the retainer when the body is in a second position, and wherein the electrical path is disrupted when the body is in the first position and the electrical path is established when the body is in the second position.

The switch may include a body including a hole, wherein the hole in the body receives a retainer when the body is in a first position and receives the retainer when the body is in a second position, and wherein the electrical path is disrupted when the body is in the first position and the electrical path is established when the body is in the second position.

The switch may include a body with threads, and a conductor coupled to the first electrode, wherein the body is to move to a first position along the threads when a first force is applied and the body is to move to a second position along the threads when a second force is applied, and wherein the switch establishes an electrical path between the first electrode and the case through the conductor when the body is in the first position and disrupts the electrical path between the first electrode and the case when the body is in the second position. The first force may be applied to move the body in a first direction, and the second force may be applied to move the body in a second direction opposing the first direction.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
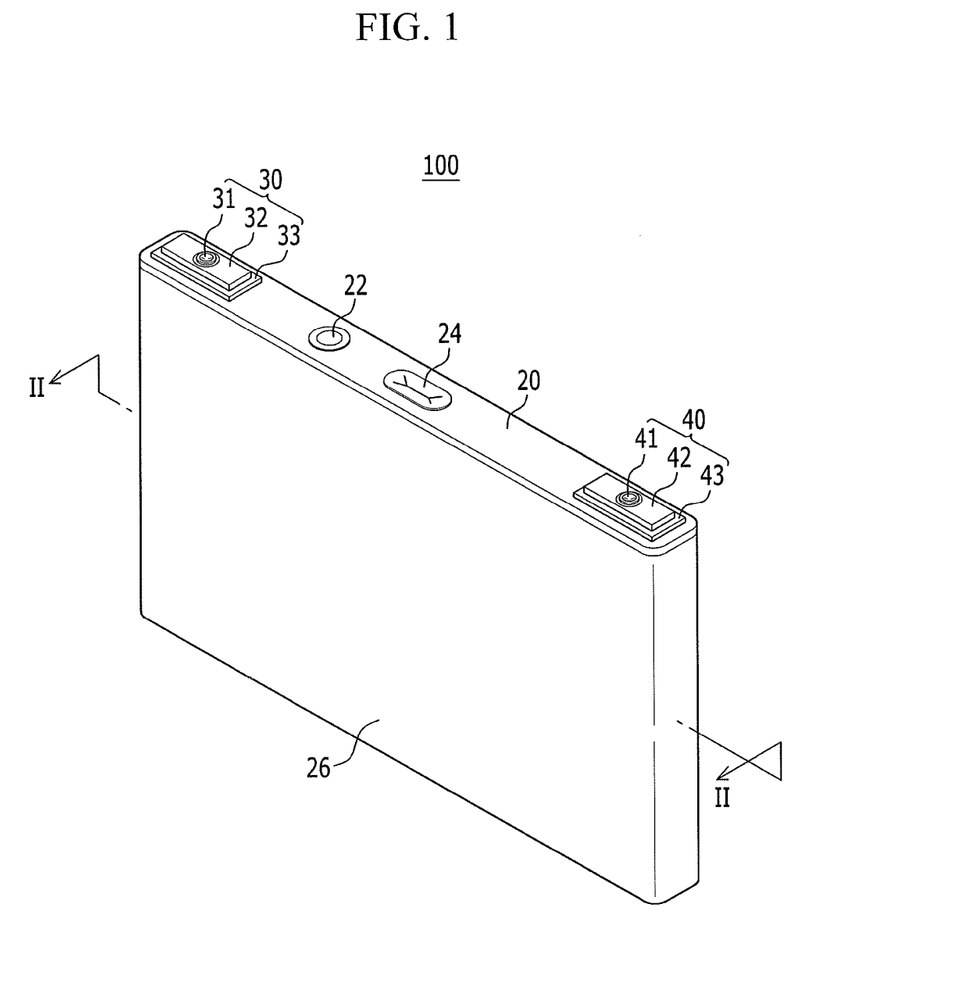
FIG. 1 illustrates an embodiment of a rechargeable battery.
Figure 2:
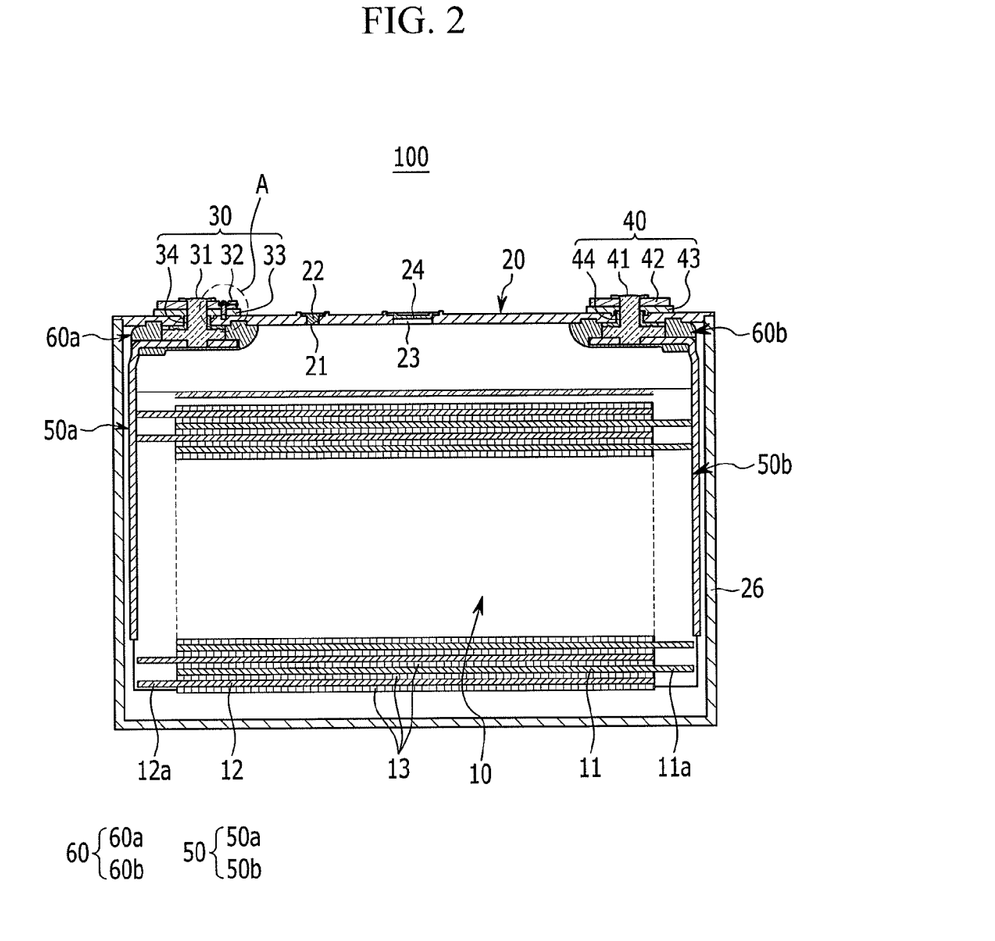
FIG. 2 illustrates a view along section line II-II in FIG. 1.

FIG. 1 illustrates an embodiment of a rechargeable battery 100, and FIG. 2 illustrates a cross-sectional view of FIG. 1 taken along section line II-II. Referring to FIGS. 1 and 2, the rechargeable battery 100 includes an electrode assembly 10, a cap plate 20, a case 26, a first terminal portion 30, a second terminal portion 40, a current collecting member 50 including first and second current collecting members 50a and 50b, a lower insulating member 60 including first and second lower insulating members 60a and 60b, at least one electrode switch 70 (see FIG. 3A), and a fixing member 80 (see FIG. 3B).

The electrode assembly 10 may have, for example, a jelly-roll shape by spirally winding all of a first electrode 11, a second electrode 12, and a separator 13. The first electrode 11 may be a negative electrode and the second electrode 12 may be a positive electrode, or vice versa.

The first and second electrodes 11 and 12 may respectively include a current collector formed of a thin metal foil, and an active material coated on a surface of each current collector. For example, the first and second electrodes 11 and 12 may be partitioned into coated regions on which the active material is coated on the current collector, and first and second electrode uncoated regions 11a and 12a, disposed at opposite sides of the coated regions in a jelly-roll state, on which the active material is not coated.

In another embodiment, the electrode assembly 10 may have a shape different from a jelly-roll shape. For example, the electrode assembly 10 may have a layered structure in which the first and second electrodes 11 and 12 are layered with an intervening separator 13. In this case, each of the electrodes 11 and 12 may be formed from a plurality of sheets.

An opening is formed in the case 26. The electrode assembly 10 may be inserted through the opening to be accommodated in the case 26.

The cap plate 20 is coupled in or over the opening of the case 26 to seal the case 26. The cap plate 20 may include an electrolyte injection opening 21, a sealing cap 22 for sealing the electrolyte injection opening 21, a vent plate 24 to be ruptured when internal pressure of the case 26 exceeds a predetermined internal pressure, and a vent hole 23 where the vent plate 24 is installed.

The terminal portions 30 and 40 include terminal members 31 and 41, terminal plates 32 and 42, insulating members 33 and 43, and gaskets 34 and 44. For example, the first terminal portion 30 may include a first terminal member 31, a first terminal plate 32, a first insulating member 33, and a first gasket 34.

The first terminal member 31 is electrically coupled to the second electrode 12 of the electrode assembly 10 through the first current collecting member 50a, such that it is installed to penetrate the cap plate 20.

The first terminal plate 32 may be combined to the first terminal member 31, to and is electrically coupled to the second electrode 12 of the electrode assembly 10 through the first terminal member 31.

The first insulating member 33 is installed between the first terminal plate 32 and the cap plate 20 to provide insulation therebetween. The first gasket 34 may be installed between the first terminal member 31 and the cap plate 20 to provide insulation therebetween.

The second terminal portion 40 may include a second terminal member 41, a second terminal plate 42, a second insulating member 43, and a second gasket 44. The second terminal portion 40 may have the same configuration as the first terminal portion 30, but this is not a necessity.

The second terminal member 41 of the second terminal portion 40 is electrically coupled to the first electrode 11 of the electrode assembly 10 through the second current collecting member 50b. The second terminal plate 42 may be combined to the second terminal member 41, and may be electrically coupled to the first electrode 11 of the electrode assembly 10 through the second terminal member 41.

The electrode switch 70 is installed at the cap plate and may penetrate through the terminal plate 32 and the insulating member 33. The electrode switch 70 may have a length that exceeds an interval between the terminal plate 32 and the cap plate 20.

Figure 3A:
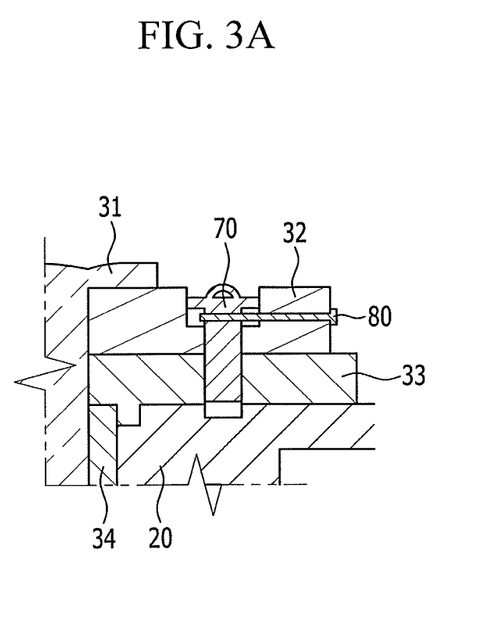
FIG. 3A illustrates an enlarged view of a portion A in FIG. 2.
Figure 3B:
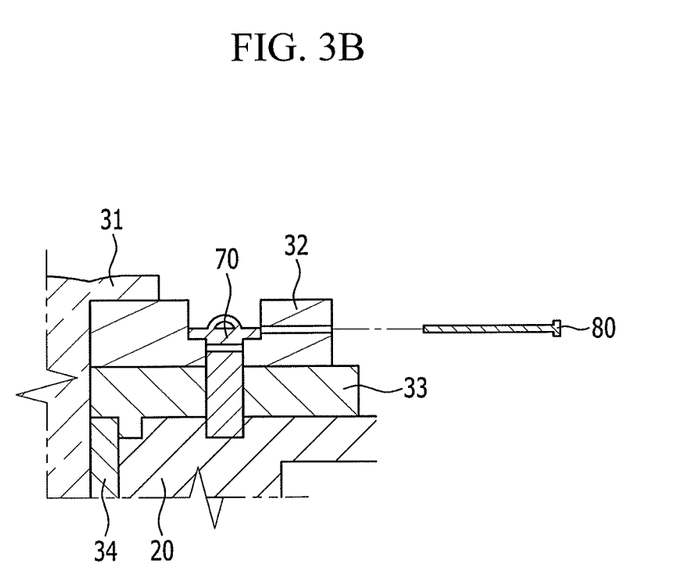
FIG. 3B illustrates a contacting state of an electrode switch and a cap plate according to one embodiment.
Figure 4:
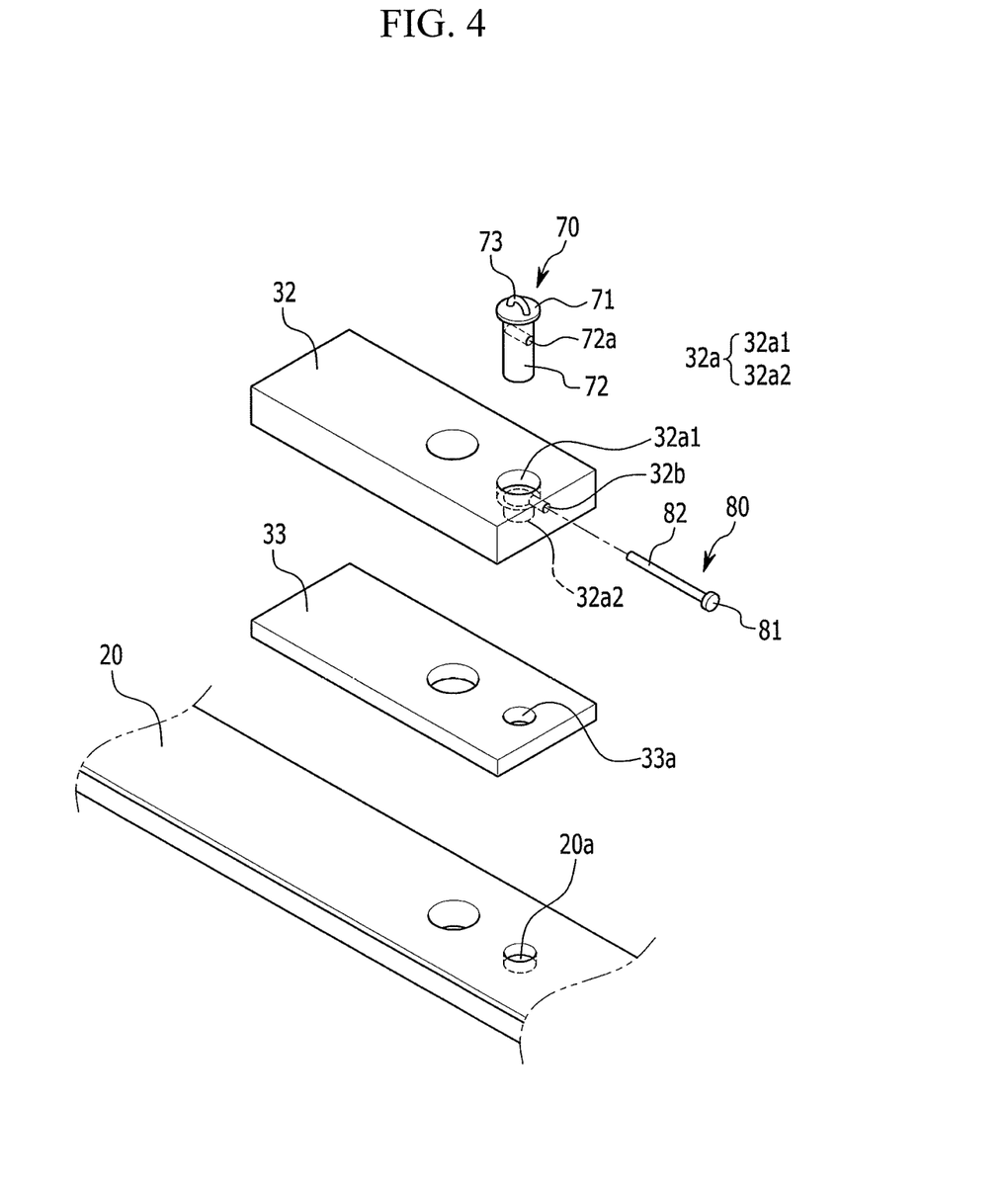
FIG. 4 illustrates an exploded view of the rechargeable battery in FIG. 1.

FIG. 3A illustrates an enlarged view of portion A in FIG. 2, and FIG. 3B is a partial cross-sectional view of a contacting state of the electrode switch and the cap plate according to one embodiment. FIG. 4 is a partial exploded perspective view of the rechargeable battery in FIG. 1

Referring to FIGS. 3A to 4, the electrode switch 70 includes a head portion 71, a body 72 extending from the head portion 71 and including a coupling hole 72a, and a handle portion 73 protruding from the head portion 71. The body 72 of the electrode switch 70 has a length that exceeds the interval between the first terminal plate 32 and the cap plate 20. The fixing member 80 includes a second portion 82 extending from a first portion 81.

The electrode switch 70 is installed at a plate through-hole 32a at the first terminal plate 32 and in an insulating member through-hole 33a at the first insulating member 33. The plate through-hole 32a of the first terminal plate 32 includes a first plate through-hole 32a1 where the head portion 71 of the electrode switch 70 is positioned, and a second plate through-hole 32a2 through which the body 72 passes. The first terminal plate 32 includes a first fixing hole 32b at a lateral side of the first terminal plate 32 and to which the fixing member 80 is fixed.

As shown in FIG. 3A, when the electrode switch 70 does not contact the cap plate 20, the case 26 is electrically neutral. For example, when the coupling hole 72a in the body 72 of the electrode switch 70 faces the first fixing hole 32b in the first terminal plate 32, the end of the second portion 82 of the fixing member 80 in the first fixing hole 32b is inserted into the coupling hole 72a of the electrode switch 70. In this case, the electrode switch 70 is fixed to the first terminal plate 32 by the fixing member 80, and one end of the electrode switch 70 is spaced from the cap plate 20. As a result, the electrode switch 70 and the cap plate 20 do not contact each other, and the case 26 is electrically neutral because it is not electrically coupled to the second electrode 12.

Referring to FIG. 3B, the electrical polarity of the case 26 may be changed to have electrically positive or negative polarity. This occurs when the electrode switch 70 and the cap plate 20 contact each other. When this occurs, the case 26 becomes electrically positive or negative. In one embodiment, the first electrode 11 may be the negative electrode and the second electrode 12 may be the positive electrode. Alternatively, the first electrode 11 may be the positive electrode and the second electrode 12 may be the negative electrode.

The electrical polarity of the case may be changed by changing the orientation or position of the fixing member 80. For example, when the fixing member 80 is separated from the coupling hole 72a of the electrode switch 70, the electrode switch 70 moves toward the cap plate 20. As a result, one end of the body 72 of the electrode switch 70 is contacts, e.g., completely fills, a fixing groove 20a in the cap plate 20. Thus, the cap plate 20 is electrically coupled to the second electrode 12 (the positive electrode in this embodiment) through the electrode switch 70 and the first terminal plate 32. As a result, the case may have an electrically positive polarity. The orientation or position of the fixing member 80 may be changed, for example, by a user inserting or removing the fixing member 80 into or from the first fixing hole 32b using his fingers and/or a tool.

When the electrode switch 70 and the cap plate 20 are separated so that they do not contact each other, the case 26 may once again be electrically neutral. This may be accomplished using the handle portion 73 formed at the head portion 71 of the electrode switch 70. When the handle portion 73 is caught, e.g., by a hook, the electrode switch 70 may be separated from the cap plate 20. At this time, the fixing member 80 may be inserted into the coupling hole 72a of the electrode switch 70, to fix the electrode switch 70 to the first terminal plate 32. As a result, the case 26 becomes electrically neutral, e.g., is no longer electrically coupled to the second electrode 12 because the electrode switch 70 and the cap plate 20 do not contact each other.

Because the electrical polarity of the case 26 may be changed to be electrically neutral, positive, or negative, the rechargeable battery may be made electrically safe when a short-circuit occurs. As a result, easy quality management (e.g., detection of a voltage abnormality in the rechargeable battery) may be provided.

Figure 5:
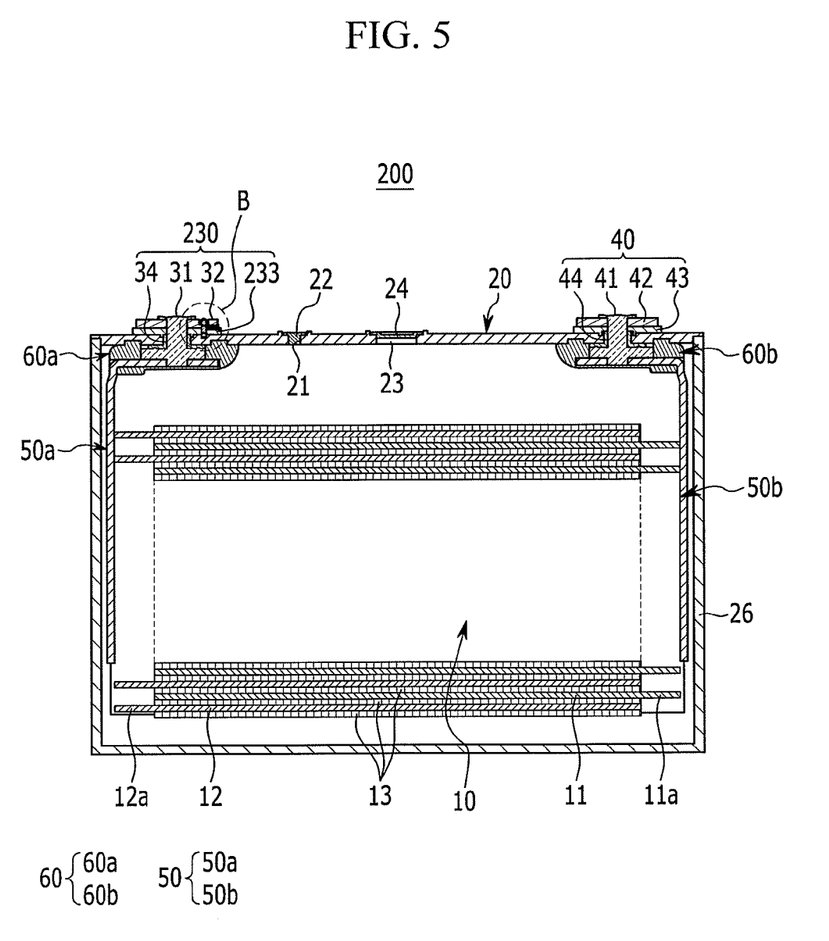
FIG. 5 illustrates another embodiment of a rechargeable battery.
Figure 6A:
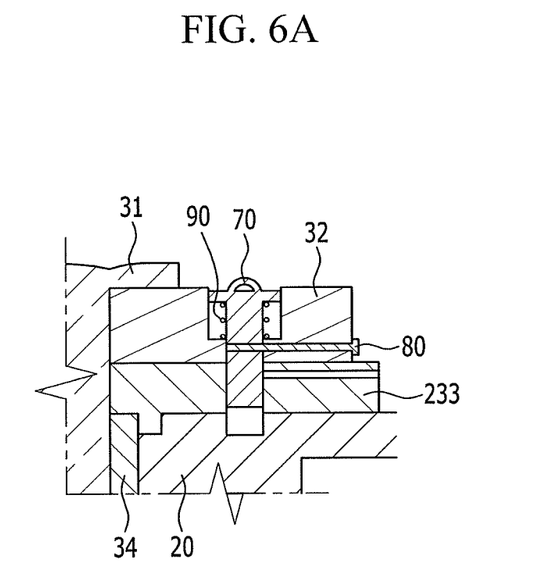
FIG. 6A illustrates an enlarged view of portion B in FIG. 5.
Figure 6B:
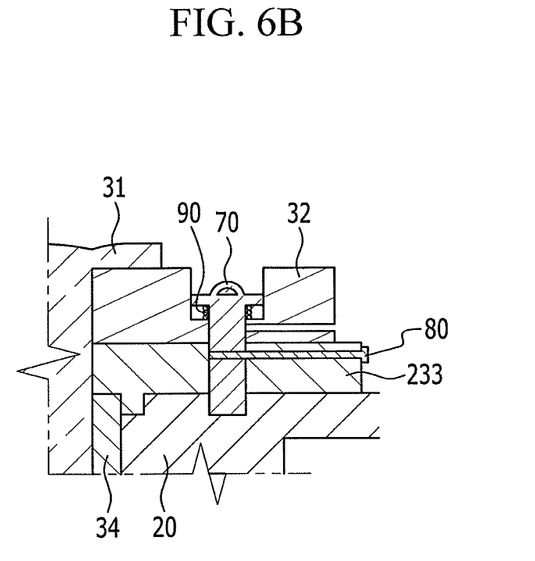
FIG. 6B illustrates a contacting state of an electrode switch and a cap plate according to one embodiment.
Figure 7:
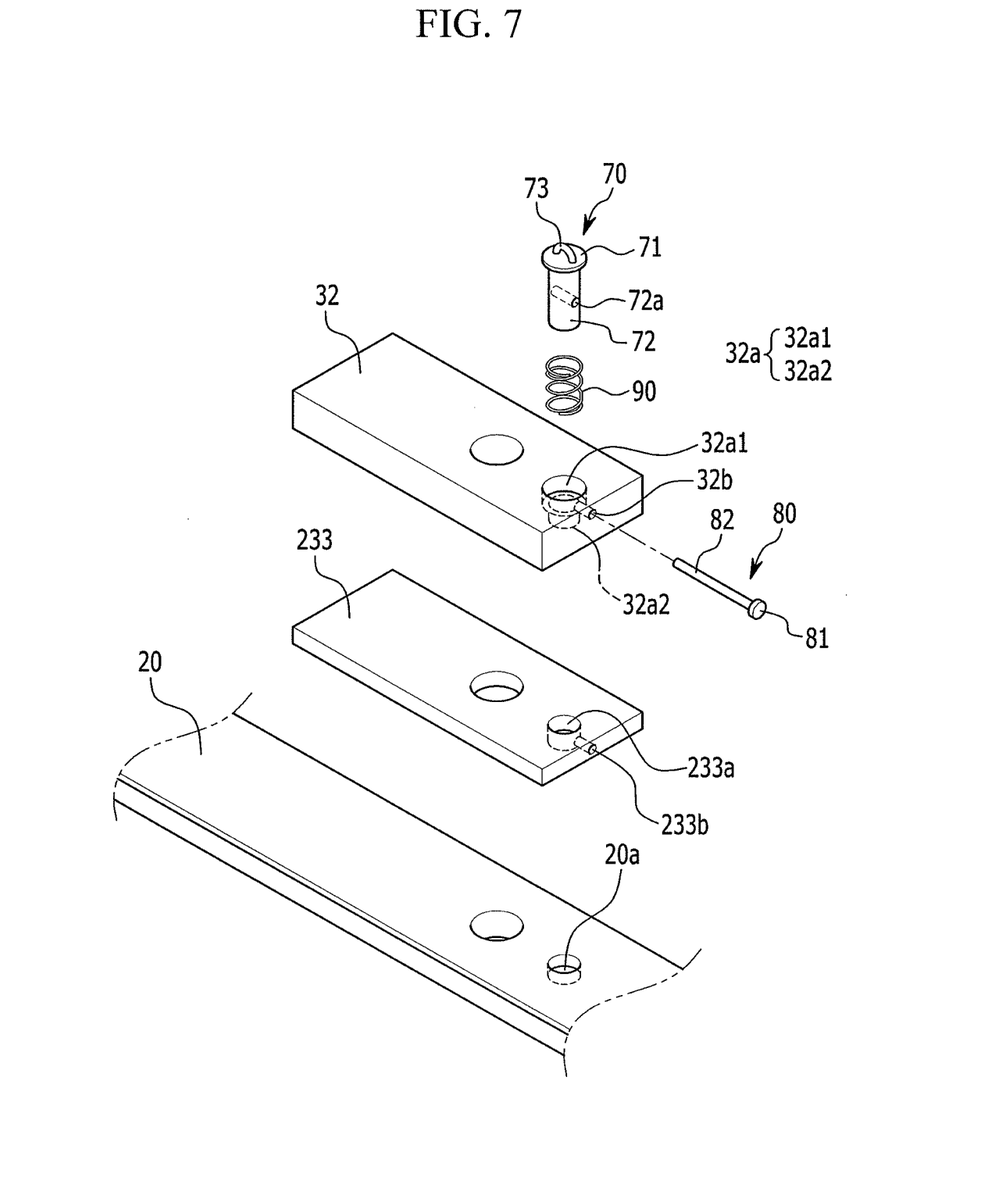
FIG. 7 illustrates an exploded view of the rechargeable battery in FIG. 5.

FIG. 5 illustrates another embodiment of a rechargeable battery 200, FIG. 6A is an enlarged view of portion B in FIG. 5, FIG. 6B is a partial cross-sectional view of a contacting state of an electrode switch and a cap plate according to this embodiment, and FIG. 7 is a partial exploded perspective view of the rechargeable battery 200.

Referring to FIGS. 5 to 7, the rechargeable battery 200 may have the same configuration as the rechargeable battery 100, except for a first insulating member 233 and an elastic member 90.

The elastic member 90 according to the present exemplary embodiment may be installed between the electrode switch 70 and the first terminal plate 32. The elastic member 90 may include, for example, a spring. The first insulating member 233 may include a through-hole 233a, and a second fixing hole 233b to which the fixing member 80 may contact under certain circumstances.

Referring to FIG. 6A, when the electrode switch 70 does not contact the cap plate 20, the case 26 becomes electrically neutral. Referring to FIG. 6B, when the electrode switch 70 and the cap plate 20 contact each other, the case 26 becomes electrically positive or negative. The first electrode 11 may be the negative electrode and the second electrode 12 may be the positive electrode, or the first electrode 11 may be the positive electrode and the second electrode 12 may be the negative electrode.

Specifically, after the fixing member 80 is separated from the coupling hole 72a of the electrode switch 70, the electrode switch 70 is pressed toward the cap plate 20 until the coupling hole 72a of the body 72 of the electrode switch 70 faces the second fixing hole 233b in the first insulating member 233. In this case, one end of the body 72 of the electrode switch 70 is inserted into the fixing groove 20a in the cap plate 20.

Thereafter, the fixing member 80 is inserted in the second fixing hole 233b of the first insulating member 233 and the coupling hole 72a of the body 72 of the electrode switch 70, in order to maintain a contacting state of the electrode switch 70 and the cap plate 20. Thus, the cap plate 20 is electrically coupled to the second electrode 12 (the positive electrode in this embodiment) through the electrode switch 70 and the first terminal plate 32 to make the case 26 electrically positive. The orientation or position of the fixing member 80 may be changed, for example, by a user inserting or removing the fixing member 80 into or from the first fixing hole 32b and second fixing hole 233b using his fingers and/or a tool.

Because the electrical polarity of the case 26 may be changed to be neutral, positive, or negative, electrical safety of the rechargeable battery may be ensured when a short-circuit occurs. As a result, easy quality management (e.g., detection of a voltage abnormality in the rechargeable battery) may be provided.

In one embodiment, the elastic member 90 may be disposed at the first plate through-hole 32a1 of the first terminal plate 32, while being pressed by the head portion 71 of the electrode switch 70. When this occurs, an elastic force of the elastic member 90 is applied to the head portion 71 of the electrode switch 70, and a repulsive force (generated by the elastic force applied to the electrode switch 70) is applied to the cap plate 20. By using the elastic member 90, the contacting state of the electrode switch 70 and the cap plate 20 may be firmly maintained.

In addition, when the fixing member 80 is removed from the second fixing hole 233a of the first insulating member 233 and the coupling hole 72a of the body 72 of the electrode switch 70, the electrode switch 70 moves in a direction away from the cap plate 20 by the elastic force of the elastic member 90. As a result, the electrode switch 70 and the cap plate 20 no longer contact each other. The force provided by the elastic member 90, therefore, easily separates the electrode switch 70 from the cap plate 20.

Figure 8:
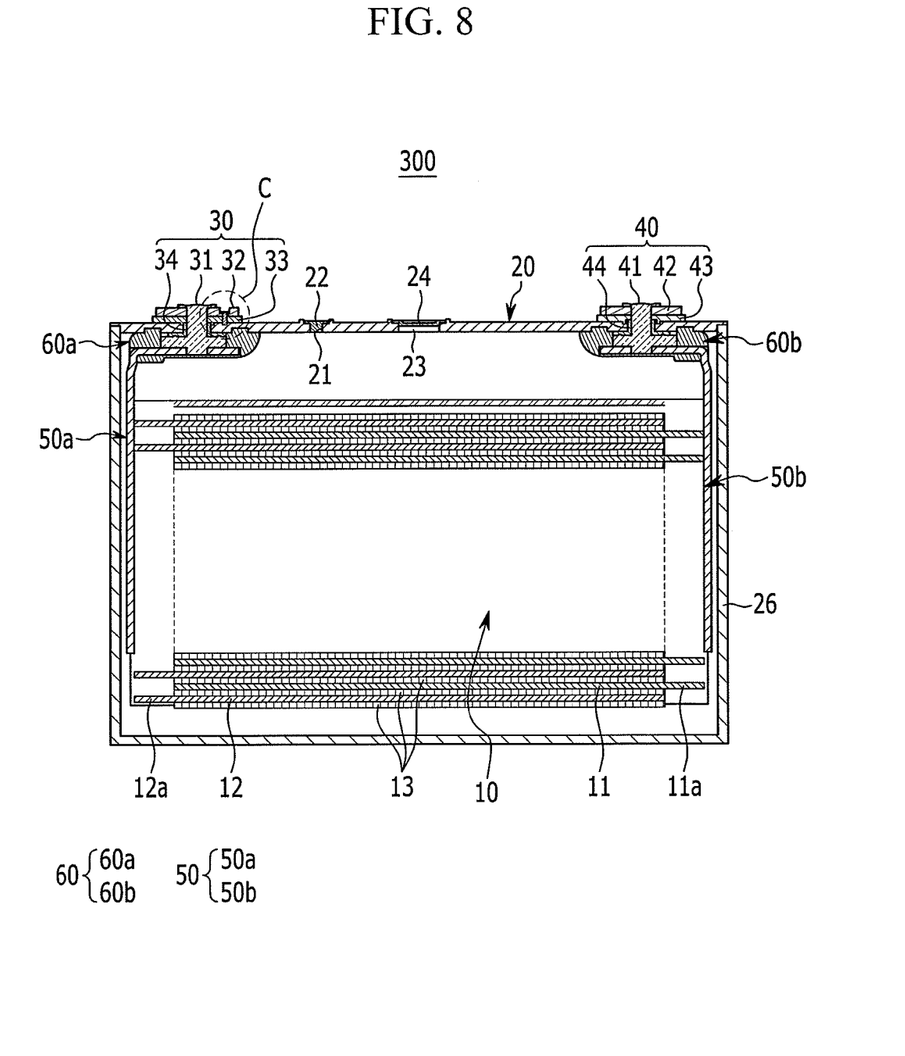
FIG. 8 illustrates another embodiment of a rechargeable battery.
Figure 9A:
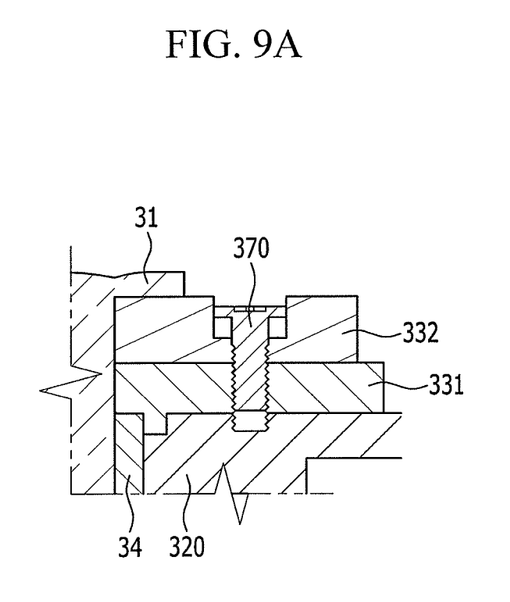
FIG. 9A illustrates an enlarged view of portion C in FIG. 8.
Figure 9B:
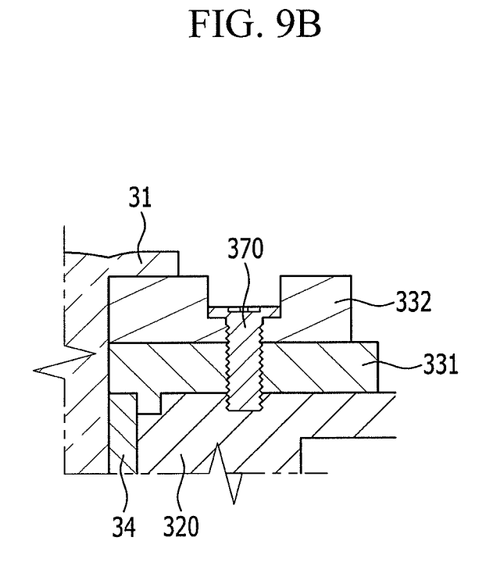
FIG. 9B illustrates a contacting state of an electrode switch and a cap plate according to one embodiment.
Figure 10:
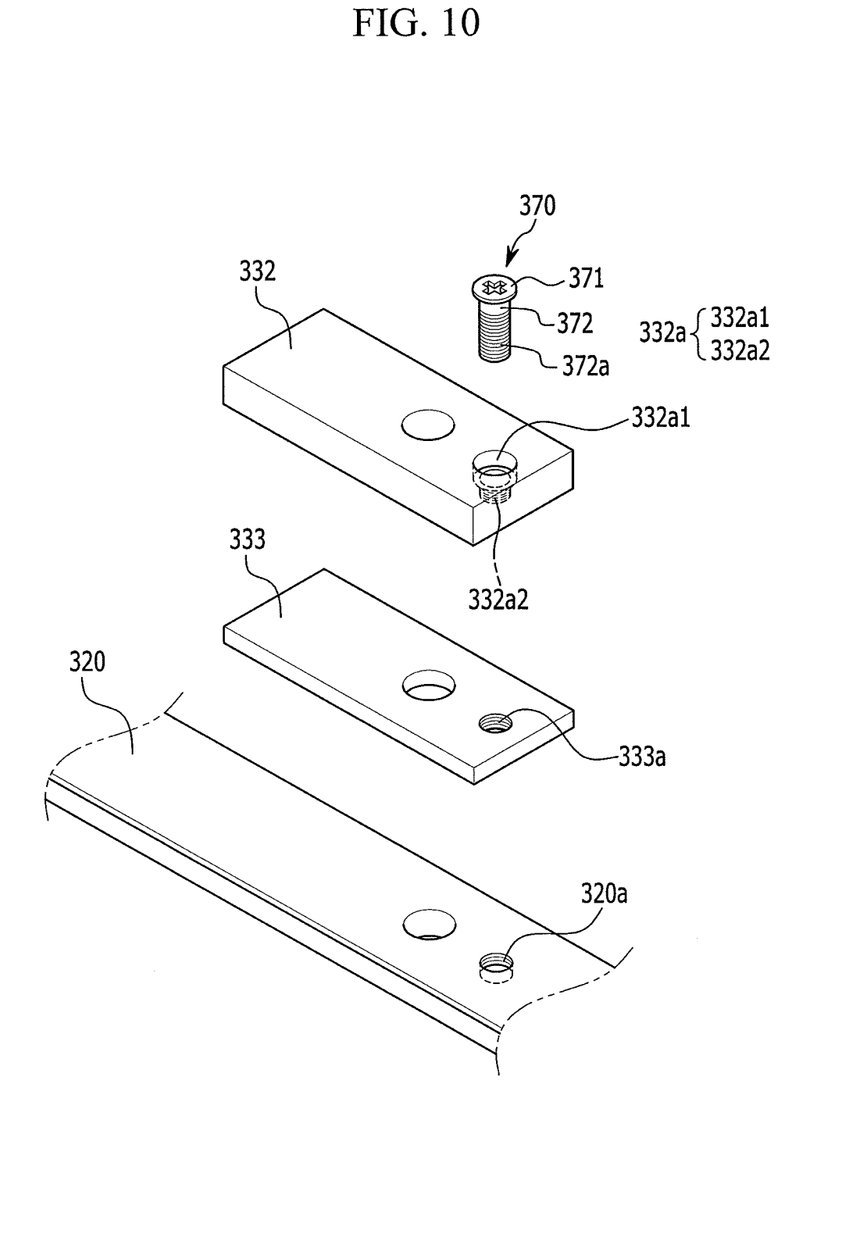
FIG. 10 illustrates an exploded view of the rechargeable battery in FIG. 8.

FIG. 8 illustrates another embodiment of a rechargeable battery 300, and FIG. 9A illustrates an enlarged view of portion C of FIG. 8. FIG. 9B is a partial cross-sectional view illustrating a contacting state of an electrode switch and a cap plate according to this embodiment. FIG. 10 is a partial exploded perspective view of the rechargeable battery 300.

Referring to FIGS. 8 to 10, the rechargeable battery 300 may have the same configuration as the rechargeable battery 100, except for a first terminal plate 332, a first insulating member 333, and an electrode switch 370.

The electrode switch 370 includes a body 372 extending from a head portion 371 and having a screw thread 372a. The electrode switch 370 is installed in a plate through-hole 332a at the first terminal plate 332 and in an insulating member through-hole 333a at the insulating member 333. The plate through-hole 332a of the first terminal plate 332 includes a first plate through-hole 332a1 where the head portion 371 of the electrode switch 370 is positioned, and a second plate through-hole 332a2 through which the body 372 passes.

A screw groove is formed in the second plate through-hole 332a2 and the insulating member through-hole 333a. The screw groove is sized to mate with the screw thread 372a in the body 372 of the electrode switch 370. The electrode switch 370 may therefore be screw-coupled to the second plate through-hole 332a2 and the insulating member through-hole 333a.

As shown in FIG. 9A, when the electrode switch 370 does not contact the cap plate 320, the case 26 becomes electrically neutral. The electrical polarity of the case 26 may be changed to have a positive or negative polarity. For example, as shown in FIG. 9B, when the electrode switch 370 and the cap plate 320 contact each other, the case 26 becomes electrically positive or negative. The first electrode 11 may be the negative electrode and the second electrode 12 may be the positive electrode, or the first electrode 11 may be the positive electrode and the second electrode 12 may be the negative electrode.

Specifically, when the electrode switch 370 is rotated, the electrode switch 370 passes through the second plate through-hole 332a2 and the insulating member through-hole 333a formed with the screw groove, and moves towards the cap plate 320. As a result, the end of the electrode switch 370 comes into contact with a fixing groove 320a of the cap plate 320. The cap plate 320 is therefore electrically coupled to the second electrode 12 (the positive electrode in this embodiment) through the electrode switch 370 to become electrically positive.

In addition, the electrode switch 370 and the cap plate 320 may be separated so that the do not contact each other, thereby making the electrical polarity of the case 26 neutral. For example, when the electrode switch 370 contacting the cap plate 320 is rotated in a direction which moves the electrode switch 370 away from the cap plate 320, the case 26 becomes electrically neutral. This is because the electrode switch 370 no longer is electrically coupled to the second electrode 12, thereby breaking electrical contact between the cap plate 320 and the electrode switch 370.

Because the electrical polarity of the case 26 may be changed to be electrically neutral, positive, or negative, electrical safety of the rechargeable battery may be ensured when a short-circuit occurs. As a result, easy quality management (e.g., detection of a voltage abnormality of the rechargeable battery) may be provided.

Also, by using an electrode switch 370 having the screw thread 372a, the electrode switch 370 may be firmly and easily coupled to the first terminal plate 332, the first insulating member 333, and the cap plate 320, without using a fixing member 80. Without this fixing member and through the use of an electrode switch 370 having the screw thread 372a, the coupling state of the electrode switch 370 and the cap plate 320 may be easily released or established.

Although the aforementioned embodiments have been described relative to a rechargeable battery, other embodiments may be applied to a battery which may not be considered to be rechargeable, e.g., a primary or other type of battery.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A rechargeable battery, comprising:
   a case;
   an electrode assembly including first and second electrodes in the case;
   a cap plate coupled to or over an opening of the case, the cap plate having a bottom surface facing the opening of the case;
   a terminal plate on a top surface of the cap plate, the terminal plate electrically coupled to the first electrode;
   an insulator between the terminal plate and the top surface of the cap plate;
   an electrode switch to move through the terminal plate and the insulator between first and second positions;
   a fixing member to fix the electrode switch to the terminal plate, wherein
   the electrode switch and the cap plate are separated by the fixing member, wherein
   the electrode switch contacts the cap plate in the first position and does not contact the cap plate in the second position, and wherein:
   the terminal plate includes a first hole to be coupled to the fixing member, and
   the electrode switch includes a coupling hole to be coupled to the fixing member.

2. The rechargeable battery as claimed in claim 1, wherein:
   the case has electrical polarity of the first electrode when the electrode switch is in the first position, and
   the case is electrically neutral when the electrode switch is in the second position.

3. The rechargeable battery as claimed in claim 1, wherein the electrode switch and the cap plate contact each other when the fixing member is separated from the coupling hole of the electrode switch.

4. The rechargeable battery as claimed in claim 3, further comprising an elastic member between the electrode switch and the terminal plate.

5. The rechargeable battery as claimed in claim 4, wherein the elastic member includes a spring.

6. The rechargeable battery as claimed in claim 4, wherein:
the insulator includes a second hole to be coupled to the fixing member, and
the fixing member is coupled to the coupling hole of the electrode switch to maintain a contacting state of the electrode switch and the cap plate.

7. A rechargeable battery, comprising:
a case;
an electrode assembly including first and second electrodes in the case;
a cap plate coupled to or over an opening of the case;
a terminal plate electrically coupled to the first electrode;
an insulator between the terminal plate and the cap plate; and
an electrode switch to move through the terminal plate and the insulator between first and second positions, wherein the electrode switch contacts the cap plate in the first position and does not contact the cap plate in the second position, wherein:
the electrode switch includes a head portion and a body, the head portion coupled to the terminal plate, the body including a screw thread and extending from the head portion.

8. The rechargeable battery as claimed in claim 7, wherein the electrode switch includes a handle portion coupled to the head portion.

9. The rechargeable battery as claimed in claim 7, wherein the body has a length exceeding an interval between the terminal plate and the cap plate.

10. A battery, comprising:
a case;
first and second electrodes in the case; and
a switch to change an electrical state of the case between a first state and a second state, when the first state corresponds to an electrically neutral state and the second state corresponds to an electrical polarity of the first electrode, wherein the switch includes:
a body with threads, and
a conductor coupled to the first electrode,
wherein the body is to move to a first position along the threads when a first force is applied and the body is to move to a second position along the threads when a second force is applied, and wherein the switch establishes an electrical path between the first electrode and the case through the conductor when the body is in the first position and disrupts the electrical path between the first electrode and the case when the body is in the second position.

11. The battery as claimed in claim 10, wherein the switch reciprocally changes the electrical state of the case between the first state and the second state.

12. The battery as claimed in claim 10, wherein the switch changes the electrical state of the case based on a force derived from an action of a user.

13. The battery as claimed in claim 10, further comprising:
a conductor coupled to the first electrode,
wherein the switch establishes an electrical path between the first electrode and the case through the conductor when the switch is in the second position and disrupts the electrical path between the first electrode and the case when the switch is in the first position.

14. The battery as claimed in claim 13, wherein
the body of the switch includes a hole, the hole of the body to receive a retainer when the body is in a first position and not to receive the retainer when the body is in a second position, and wherein
the electrical path is disrupted when the body is in the first position and the electrical path is established when the body is in the second position.

15. The battery as claimed in claim 13, wherein
the body of the switch includes a hole, the hole of the body to receive a retainer when the body is in a first position and to receive the retainer when the body is in a second position, and wherein
the electrical path is disrupted when the body is in the first position and the electrical path is established when the body is in the second position.

16. The battery as claimed in claim 10, wherein:
the first force is applied to move the body in a first direction, and
the second force is applied to move the body in a second direction opposing the first direction.

* * * * *